(12) United States Patent
Hatano

(10) Patent No.: US 7,793,341 B2
(45) Date of Patent: Sep. 7, 2010

(54) INFORMATION PROCESSING APPARATUS AND IDENTIFICATION CONTROL METHOD

(75) Inventor: Ken Hatano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/267,462

(22) Filed: Nov. 7, 2008

(65) Prior Publication Data

US 2009/0165093 A1  Jun. 25, 2009

(30) Foreign Application Priority Data

Dec. 21, 2007  (JP) .............................. 2007-331083

(51) Int. Cl.
  G06F 7/04 (2006.01)
  G06F 15/16 (2006.01)
  G06F 17/30 (2006.01)
  H04L 29/06 (2006.01)

(52) U.S. Cl. .......................................... 726/4; 713/155

(58) Field of Classification Search ..................... 726/4; 713/155
See application file for complete search history.

(56) References Cited

U.S. PATENT DOCUMENTS

| | | | | | |
|---|---|---|---|---|---|
| 5,204,902 | A | * | 4/1993 | Reeds et al. | 380/248 |
| 5,237,612 | A | * | 8/1993 | Raith | 380/247 |
| 5,257,412 | A | * | 10/1993 | Tomioka et al. | 455/411 |
| 5,386,468 | A | * | 1/1995 | Akiyama et al. | 380/249 |
| 5,444,764 | A | * | 8/1995 | Galecki | 455/411 |
| 5,457,737 | A | * | 10/1995 | Wen | 455/410 |
| 5,572,571 | A | * | 11/1996 | Shirai | 455/551 |
| 5,600,708 | A | * | 2/1997 | Meche et al. | 455/411 |
| 5,602,536 | A | * | 2/1997 | Henderson et al. | 340/5.23 |
| 5,603,084 | A | * | 2/1997 | Henry et al. | 455/419 |
| 6,119,020 | A | * | 9/2000 | Miller et al. | 455/558 |
| 6,124,799 | A | * | 9/2000 | Parker | 340/5.85 |
| 6,141,563 | A | * | 10/2000 | Miller et al. | 455/558 |
| 6,314,283 | B1 | * | 11/2001 | Fielden | 455/411 |

(Continued)

FOREIGN PATENT DOCUMENTS

DE  101 28 948 A1  6/2001

(Continued)

OTHER PUBLICATIONS

An English translation of Notice of Reasons for Rejection issued by the Japan Patent Office on Jan. 6, 2009.

(Continued)

*Primary Examiner*—David García Cervetti
(74) *Attorney, Agent, or Firm*—Knobbe, Martens, Olson & Bear LLP

(57) ABSTRACT

According to one embodiment, an information processing apparatus includes a cabinet, a first storage module contained in the cabinet, a communication unit which is detachably inserted into the cabinet, equipped with a second storage module, and used for connecting to a communication line, a verification module which verifies identification information of the communication unit stored in the first storage module against that of the communication unit stored in the second storage module after receiving an instruction of activation of the information processing apparatus, a registration module which registers with the predetermined server unit for use of the communication unit when verification is performed against the identification information of the communication unit stored in the predetermined server unit and the use of the communication unit is determined to be matching.

8 Claims, 5 Drawing Sheets

U.S. PATENT DOCUMENTS

| | | | |
|---|---|---|---|
| 6,336,038 B1 * | 1/2002 | Nojima et al. | 455/557 |
| 6,583,714 B1 * | 6/2003 | Gabou et al. | 340/5.54 |
| 6,947,727 B1 * | 9/2005 | Brynielsson | 455/411 |
| 6,986,157 B1 * | 1/2006 | Fijolek et al. | 725/111 |
| 7,054,613 B2 * | 5/2006 | Smeets | 455/410 |
| 7,137,003 B2 * | 11/2006 | Krishnan et al. | 713/172 |
| 7,555,571 B1 * | 6/2009 | Skinner | 710/10 |
| 2004/0266433 A1 * | 12/2004 | Maillard et al. | 455/435.1 |
| 2008/0004061 A1 * | 1/2008 | Takeda | 455/518 |

FOREIGN PATENT DOCUMENTS

| | | | |
|---|---|---|---|
| JP | 06-216842 | | 8/1994 |
| JP | 09-121387 | | 5/1997 |
| JP | 11-501182 | | 1/1999 |
| JP | 11-168574 | | 6/1999 |
| JP | 11168574 A | * | 6/1999 |
| JP | 11-252247 | | 9/1999 |
| JP | 2000-510303 | | 8/2000 |
| JP | 2000-286957 | | 10/2000 |
| JP | 2000286957 A | * | 10/2000 |
| JP | 2004-64657 | | 2/2004 |
| JP | 2006-319990 | | 11/2006 |

OTHER PUBLICATIONS

European Search Report issued May 11, 2009.

* cited by examiner

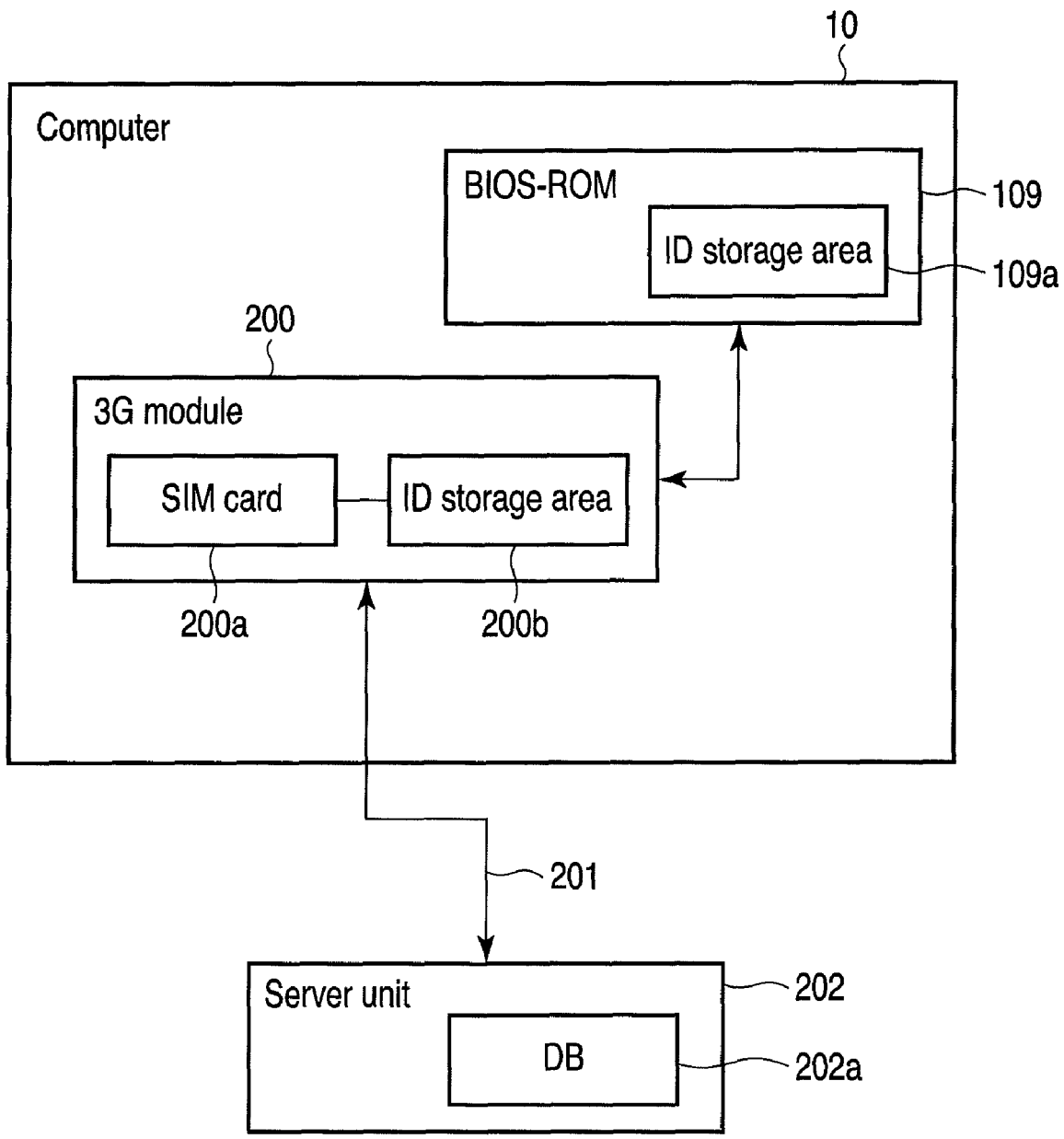
F I G. 3

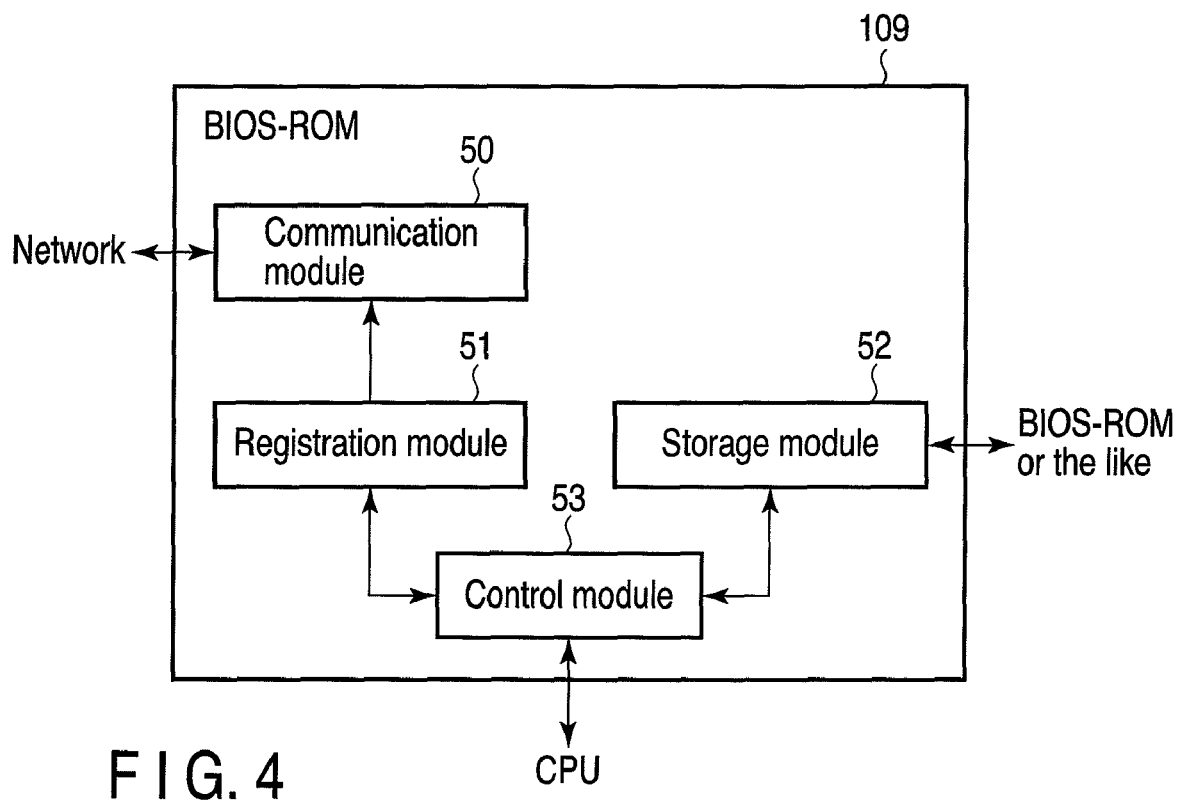
F I G. 4
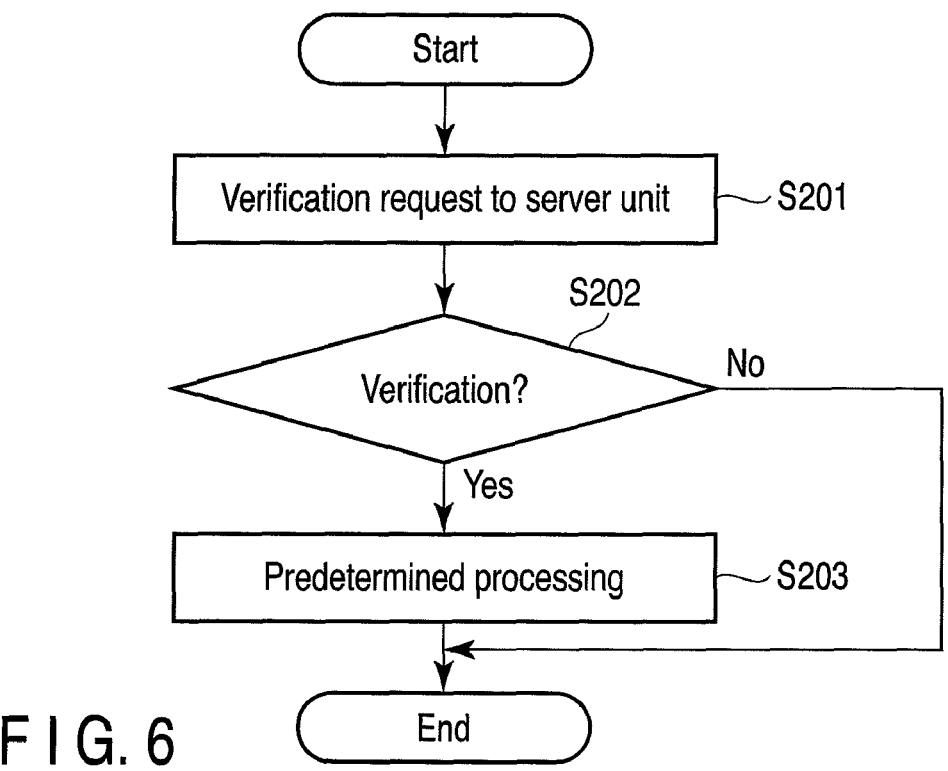
F I G. 6

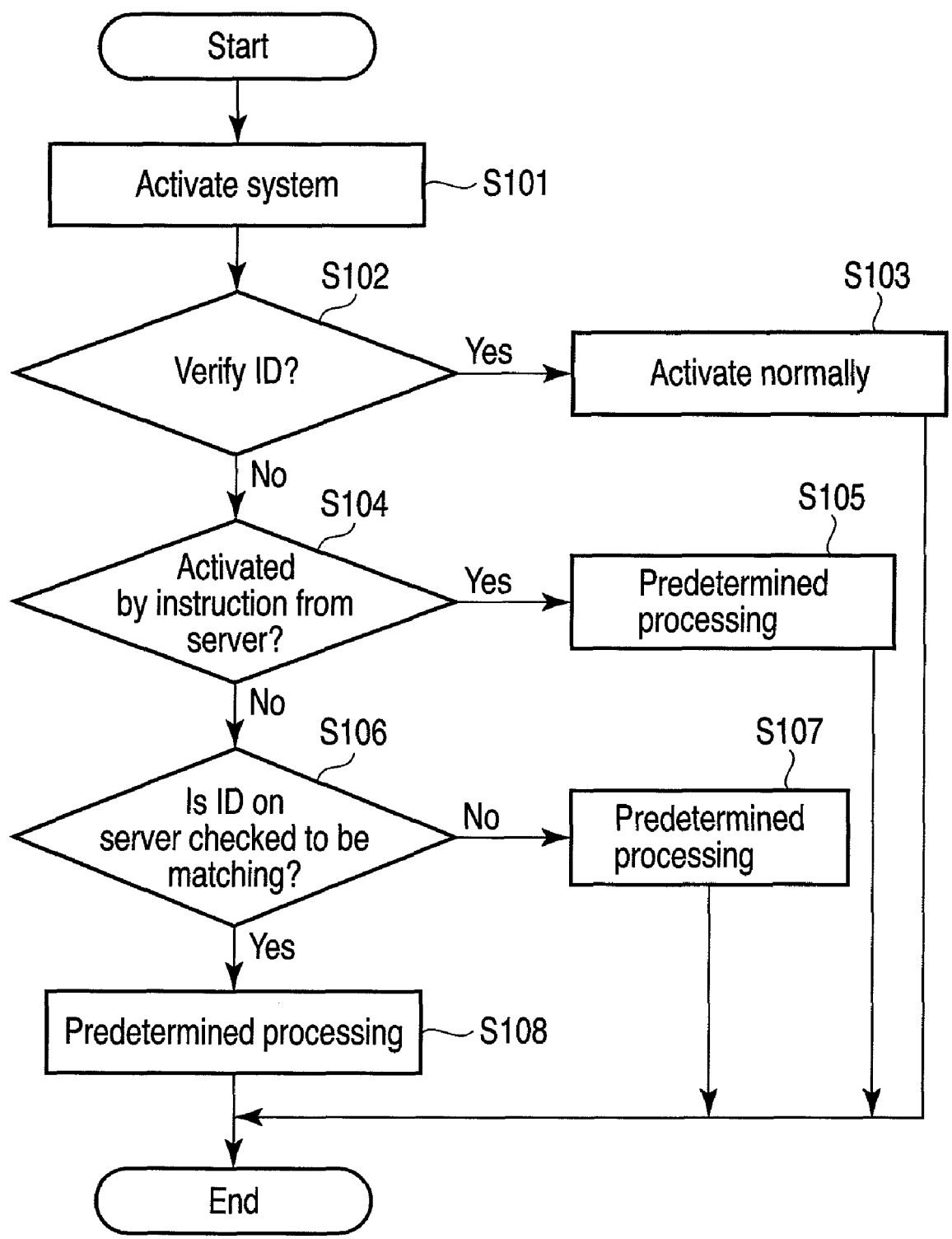
F I G. 5

INFORMATION PROCESSING APPARATUS AND IDENTIFICATION CONTROL METHOD

CROSS-REFERENCE TO RELATED APPLICATIONS

This application is based upon and claims the benefit of priority from Japanese Patent Application No. 2007-331083, filed Dec. 21, 2007, the entire contents of which are incorporated herein by reference.

BACKGROUND

1. Field

One embodiment of the present invention relates to an identification technology of a connected communication unit, and in particular, relates to an information processing apparatus and an identification control method capable of preventing the use of invalid communication units.

2. Description of the Related Art

In recent years, in general, information terminal apparatuses to which mobile phones can be connected are increasingly used. A technology is disclosed (see Jpn. Pat. Appln. KOKAI Publication No. 11-168574) by which identification information of mobile phones is held inside such information terminal apparatuses and identification information of a connected mobile phone is verified, and if the identification information does not match, the connected mobile phone is locked to restrict the use thereof.

However, the technology described in Jpn. Pat. Appln. KOKAI Publication No. 11-168574 can only restrict the use of a mobile phone by locking the mobile phone when identification information verification does not match.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary block diagram schematically showing a main configuration example of the information processing apparatus according to the embodiment;

FIG. 4 is an exemplary conceptual diagram showing a function of a BIOS-ROM of the information processing apparatus according to the embodiment;

FIG. 5 is an exemplary flowchart illustrating an identification control method according to the embodiment; and FIG. 6 is an exemplary flowchart illustrating the identification control method according to the embodiment.

DETAILED DESCRIPTION

Various embodiments according to the invention will be described hereinafter with reference to the accompanying drawings. In general, according to one embodiment of the invention, an information processing apparatus includes: a cabinet; a first storage module contained in the cabinet; a communication unit which is detachably inserted into the cabinet, equipped with a second storage module, and used for connecting to a communication line; a verification module which verifies identification information of the communication unit stored in the first storage module against that of the communication unit stored in the second storage module after receiving an instruction of activation of the information processing apparatus; a limited processing module which performs determination processing by accessing a predetermined server unit through the communication unit via the communication line if the verification module determines that the identification information of the information processing apparatus and that of the communication unit do not match, performs processing to limit use of the information processing apparatus if the instruction of activation is determined to be an instruction from the predetermined server unit, performs verification of the identification information of a communication unit stored by the predetermined server unit against that of the communication unit if the instruction of activation is determined not to be an instruction from the predetermined server unit, and performs processing to limit activation of the information processing apparatus if use of the communication unit is determined to be not matching; and a registration module which registers with the predetermined server unit for use of the communication unit when verification is performed against the identification information of the communication unit stored in the predetermined server unit and the use of the communication unit is determined to be matching.

An embodiment of the present invention will now be described with reference to the drawings.

First, the configuration of an information processing apparatus according to an embodiment of the present invention will be described with reference to FIGS. 1 and 2. The information processing apparatus is realized, for example, as a notebook personal computer 10.

Figure 1:
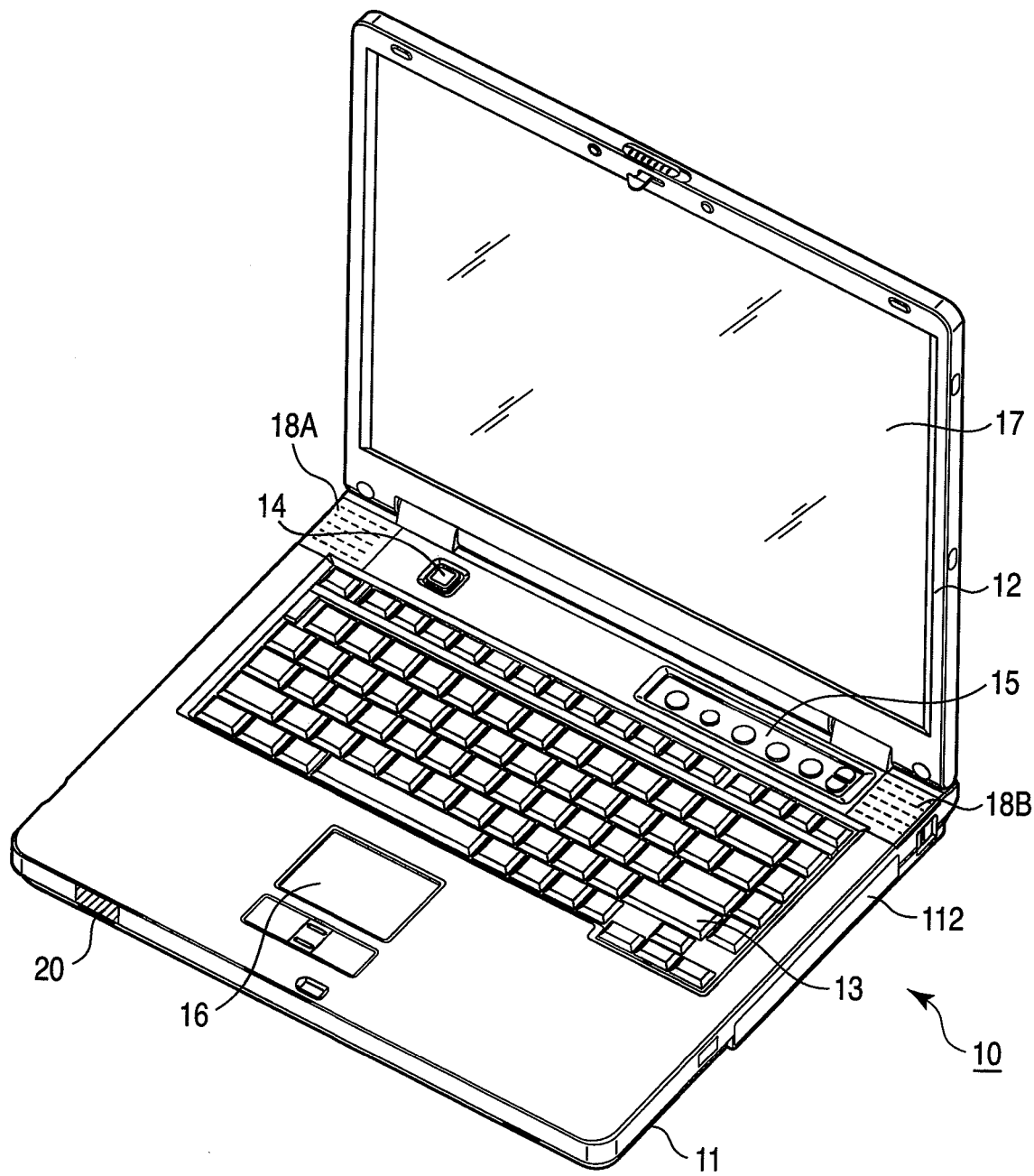
FIG. 1 is an exemplary perspective view of an information processing apparatus according to an embodiment of the present invention.

FIG. 1 is a perspective view in a state in which a display unit of the notebook personal computer 10 is opened. The computer 10 is comprised of a computer main body 11 and a display unit 12. The display unit 12 has a display apparatus comprised of a TFT-LCD (Thin Film Transistor Liquid Crystal Display) 17 embedded therein, positioned approximately at the center of the display unit 12.

The display unit 12 is mounted freely rotatably between an open position and a closed position on the computer main body 11. The computer main body 11 has a thin box-shaped cabinet and has a keyboard 13 on the upper surface thereof, a power button 14 for turning on/off the computer 10, an input operation panel 15, a touch pad 16, speakers 18A/18B, a DVD drive 112, and a SIM (subscriber identity module) card slot 20 housing a SIM card contained in a 3G module (communication unit which is to be described later) 200 arranged thereon.

The input operation panel 15 is an input unit for inputting an event corresponding to a pressed button, and a plurality buttons are provided to start each of a plurality of functions.

Next, the system configuration of the computer 10 will be described with reference to FIG. 2.

Figure 2:
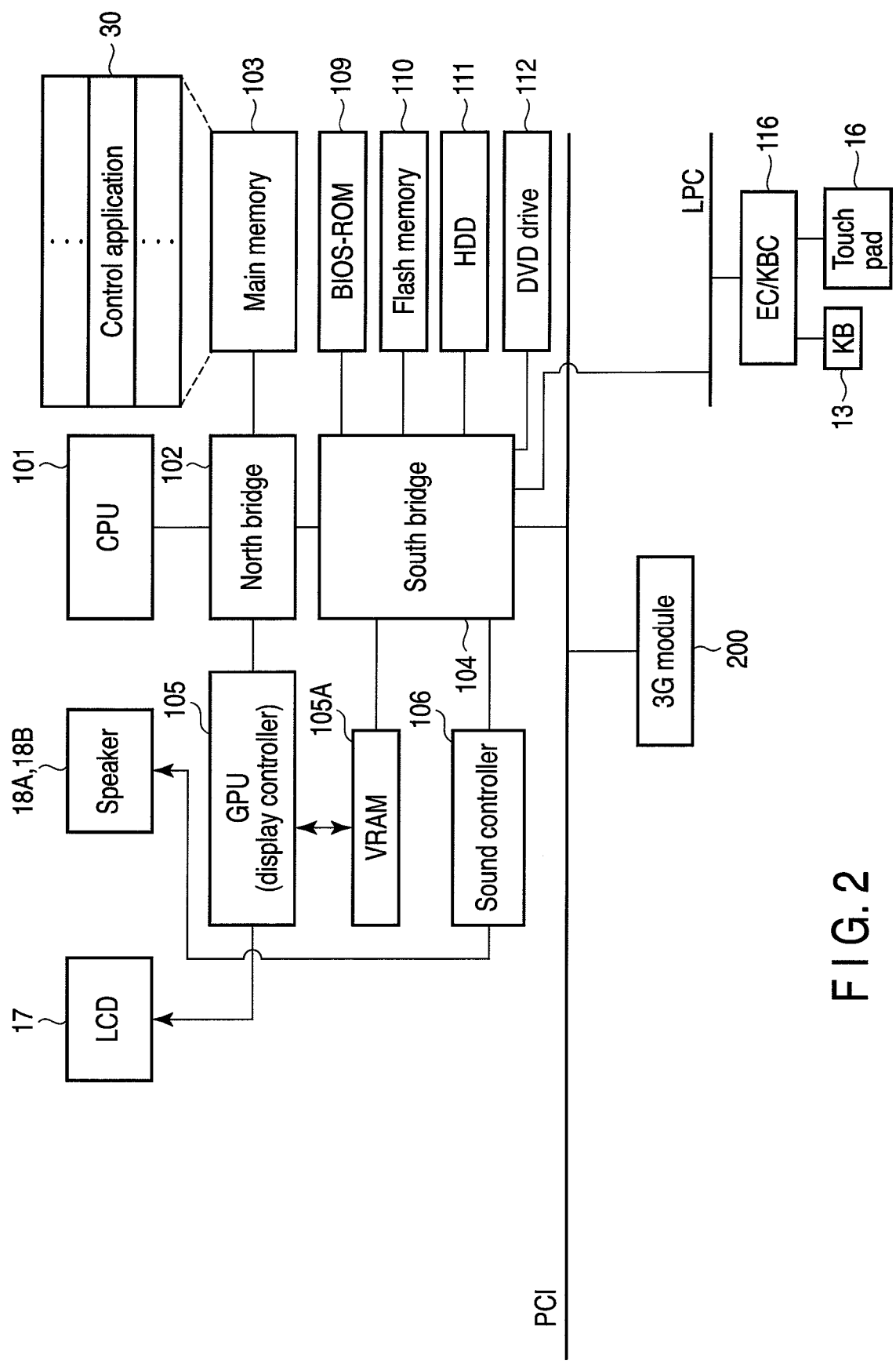
FIG. 2 is an exemplary block diagram schematically showing a configuration example of the information processing apparatus according to the embodiment.

As shown in FIG. 2, the computer 10 includes a CPU 101, a north bridge 102, a main memory 103, a south bridge 104, a GPU 105, a BIOS-ROM 109, a flash memory 110, a hard disk drive (HDD) 111, the DVD drive 112, an embedded controller/keyboard controller IC (EC/KBC) 116, the speakers 18A/18B, and the 3G module 200.

The speakers 18A/18B output a sound played by the computer 10.

The CPU 101 is a processor controlling operations of the computer 10 and executes an operating system and various kinds of applications loaded from the hard disk drive (HDD)

111 into the main memory 103. The CPU 101 also executes the BIOS (Basic Input Output System) stored in the BIOS-ROM 109. The BIOS is a program for hardware control.

The north bridge 102 is a bridge device connecting a local bus of the CPU 101 and the south bridge 104. The north bridge 102 also contains a memory controller controlling access to the main memory 103. In addition, the north bridge 102 has a function to perform communication with the GPU 105 via a serial bus of the PCI Express standard or the like.

The GPU 105 is a display controller controlling the LCD 17 used as a display monitor of the computer 10. A display signal generated by the GPU 105 is sent to the LCD 17.

The south bridge 104 controls each device on an LPC (Low Pin Count) bus and each device on a PCI (Peripheral Component Interconnect) bus. The south bridge 104 also contains an IDE (Integrated Drive Electronics) controller to control the HDD 111.

The embedded controller/keyboard controller IC (EC/KBC) 116 is a one-chip microcomputer in which an embedded controller for power management and a keyboard controller for controlling the keyboard (KB) 13 and the touch pad 16 are integrated. The embedded controller/keyboard controller IC (EC/KBC) 116 has a function to turn on/off the computer 10 in accordance with an operation of the power button 14 by a user.

Next, the main configuration of the computer 10 will be described with reference to the block diagram of FIG. 3.

The 3G module 200 is detachably contained in the computer 10. The BIOS-ROM 109 of the computer 10 holds the ID (identification information) of the connected 3G module (communication unit) 200 in an ID storage area (first storage module) 109a in advance.

The 3G module 200 detachably contained in the computer 10 has an ID storage area (second storage module) 200b holding the ID (identification information) of a SIM card 200a and a SIM card 200a. The SIM card 200a performs communication with a server 202 of a contracted mobile phone operator via a communication line 201. The server 202 also has the ID of a 3G module and that of the computer 10 using the registered 3G module registered therewith being associated with each other. Further, the server 202 has a database (DB) 202a of customer information and predetermined members.

Next, a function performed by the BIOS-ROM will be described with reference to the block diagram in FIG. 4.

The BIOS-ROM 109 includes a communication module 50, a registration module 51, a control module 53, and a storage module 52. The communication module 50 performs communication via a communication line of a 3G communication operator. The registration module 51 registers the ID of the communication module 50 permitted after matching of ID verification for use with the server 202 of the 3G communication operator via a communication line. The computer 10 to be used is also registered during the registration. The storage module 52 stores the ID of the communication module 50. The control module 53 checks the ID of the connected communication module 50 during activation or operation of the computer 10. That is, the ID of the communication module 50, which is stored by the computer 10 in advance, is verified against the ID of the connected communication module 50.

Next, an identification control method that utilizes an information processing apparatus according to the embodiment of the present invention will be described with reference to the flowchart in FIG. 5.

After receiving an instruction to activate the computer 10 (Block S101), the BIOS-ROM (verification module, limited processing module) 109 reads the ID of the 3G module 200 from the ID storage area 200b of the 3G module 200 currently connected and further reads the ID of the 3G module stored in advance and registered for use from the ID storage area 109a of the BIOS-ROM 109 of the computer 10 to verify these IDs (Block S102). If verification by the BIOS-ROM 109 shows that both IDs match, the computer 10 is normally activated (Block S103).

If, on the other hand, verification by the BIOS-ROM 109 shows that both IDs do not match (when, for example, after moving into a country, a 3G module of the country is mounted for the first time), whether or not any instruction of activation has been sent (3G Wake-up) from the server unit 202 accessible by the 3G module 200 via the communication line 201 (Block S104). If the BIOS-ROM 109 determines that an activation instruction has been sent from the server unit 202 at Block S104 (Yes at Block S104), predetermined processing is performed (Block S105). The predetermined processing at this point includes, for example, "Lock the computer 10 so that the computer cannot be activated", "Shut down the Computer 10", "Permit only activation (booting)", and "Activate the computer 100 normally". Such processing can be set to the BIOS-ROM 109 or the like in advance.

If, on the other hand, if the BIOS-ROM 109 determines that no activation instruction has been sent from the server unit 202 at Block S104 (No at Block S104, for example, the power button 14 is pressed), the BIOS-ROM 109 accesses the server unit 202 via the communication line 201 to determine whether or not the connected 3G module 200 is matching for use (Block S106, see the flowchart in FIG. 6 described later). If the BIOS-ROM 109 determines that the connected 3G module 200 is not matching for use, predetermined processing is performed (Block S107). The predetermined processing performed at this point is like the processing at Block S105.

If, on the other hand, the BIOS-ROM 109 determines that the connected 3G module 200 is matching for use, predetermined processing is performed (Block S108). The predetermined processing performed at this point is, for example, to update ID of the 3G module 200 determined to be matching for connected use and that of the computer 10 to be used of IDs registered with the server unit 202 by overwriting the previous registration. Incidentally, the ID of the 3G module 200 determined to be matching for connected use to the previous registration and that of the computer 10 to be used may be added. Also, processing at Block S S102, S104, and S106 may be performed after OS activation.

Processing when determining whether or not the connected 3G module 200 is matching for use after the BIOS-ROM 109 accesses the server unit 202 via the communication line 201 at Block S106 is shown as a flowchart in FIG. 6.

After receiving a request of ID verification from the BIOS-ROM 109 (Block S201), the server unit 202 searches the DB 202a of the server unit 202 and if the ID for which verification is requested is present (Yes at Block S202), predetermined processing is performed (Block S203). The predetermined processing performed at this point is like the processing at Block S108 described above.

At Block S202, a list of IDs permitted for registration to use the 3G module 200 (white list) and a list of IDs not permitted for registration to use the 3G module 200 (black list) are used. Also, determinations can be made about the following items. Whether or not a SIM card is registered by subscribing to the same service as a predetermined service (provided by a communication operator of the 3G module 200) to which a user of the 3G module 200 is subscribing is determined. Further, use of IDs such as "ID of an owner of a SIM card", "ID of a member registered for the same service", and "ID of another user" can be set to be usable or not usable. Determination of those IDs is performed using the registration information registered at DB 202a of the server apparatus 202.

In the processing at Block S107, the ID of the simply connected 3G module may not be registered or may be registered in a black list. Further, when the ID of an old 3G module is deleted at Block S107, the ID of the old 3G module 200 may temporarily be stored so that when the same 3G module 200 is inserted into the same computer 10 next time, the 3G module 200 can be permitted to be registered for use without communication to the server unit 202 as a previously registered communication module.

Thus, an object of the present invention is to provide an information processing apparatus that can be used by registering identification information of a replaced communication unit, in addition to identification information of a connected communication unit being pre-registered, and an identification control method.

According to the embodiment of the present invention, if verification of identification information of the connected communication unit matches, registration with a connected server can easily be performed for use. Further, in addition to registered communication modules, a communication module replaced by a user can safely and automatically be registered, realizing both convenience and safety.

Incidentally, the present invention is not limited to the embodiment described above. The present invention can be embodied in an implementation phase by changing components thereof without departing from the spirit thereof.

Also, by properly combining a plurality of components disclosed by the above embodiment, various inventions can be formed. For example, some components may be eliminated from all components shown in the embodiment. Further, components from different embodiments may properly be combined.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a body;
   a first storage module in the body, configured to store first identification information indicative of a permitted communication module;
   a communication module configured to be detachably attached to the body, comprising a second storage module, and used for connecting to a communication line;
   a verification module configured to determine whether the first identification information stored in the first storage module matches with a second identification information of the communication module stored in the second storage module after receiving a command of activation of the information processing apparatus;
   a first limiting process module configured to determine whether the command is a command received from a predetermined server if the first identification information and the second identification information do not match, and to limit use of the information processing apparatus if the command is the command received from the server;
   a second limiting process module configured to verify the second identification information by accessing the server if the command is not the command received from the server, and to limit use of the information processing apparatus if the verification of the second identification information is not successful; and
   a registration module configured to register with the server for use of the communication module if the verification of the second identification information is successful.

2. The information processing apparatus of claim 1, wherein the registration module is configured to register the second identification information of the communication module with the server.

3. The information processing apparatus of claim 2, wherein the information processing apparatus is configured to store the second identification information of the communication module in the first storage module after the registration of the second identification information.

4. The information processing apparatus of claim 1, wherein server is configured to store either a list of identification information of communication modules permitted to use or a list of identification information of communication modules not permitted to use.

5. An identification control method used for an information processing apparatus comprising a body, a first storage module in the body, configured to store first identification information indicative of a permitted communication module, and a communication module detachably attached to the body, comprising a second storage module, and used for connecting to a communication line, the method comprising:
   determining whether the first identification information stored in the first storage module matches a second identification information of the communication module stored in the second storage module after receiving a command of activation of the information processing apparatus;
   determining whether the command is a command received from a predetermined server if the first identification information and the second identification information do not match, and limiting use of the information processing apparatus if the command is the command received from the predetermined server;
   verifying the second identification information by accessing the server if the command is not the command received from the server, and limiting use of the information processing apparatus if the verification of the second identification information is not successful; and
   registering with the server for use of the communication module if the verification of the second identification information is successful.

6. The identification control method of claim 5, wherein:
   the registering includes registering the second identification information of the communication module with the server.

7. The identification control method of claim 6, further comprising:
   storing the second identification information in the first storage module after registering the second identification information.

8. The identification control method of claim 5, wherein the verifying the second identification information is performed using list information stored in the server, the list information being indicative of either a list of identification information of communication modules permitted to use or a list of identification information of communication modules not permitted to use.

* * * * *